United States Patent
King et al.

(12) 
(10) Patent No.: US 6,444,018 B1
(45) Date of Patent: *Sep. 3, 2002

(54) PHASE CHANGE INK CARRIER COMPOSITIONS CONTAINING ANHYDRIDE/AMINO ALCOHOL-BASED ADDUCTS

(75) Inventors: Clifford R. King, Salem; Jeffery H. Banning, Hillsboro; Donald R. Titterington, Tualatin, all of OR (US)

(73) Assignee: Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 13 days.

(21) Appl. No.: 09/249,479

(22) Filed: Feb. 12, 1999

Related U.S. Application Data

(63) Continuation-in-part of application No. 09/105,308, filed on Jun. 25, 1998, now Pat. No. 6,110,264.

(51) Int. Cl.$^7$ .......................... C09D 11/00; C09D 11/02; C09D 11/10
(52) U.S. Cl. ................. 106/31.29; 106/31.13; 106/31.27; 106/31.43; 106/31.57; 106/31.58; 106/31.61; 428/474.4; 428/480; 428/195; 428/206; 428/207; 528/280; 528/288; 528/291; 528/300; 528/306
(58) Field of Search ................. 428/474.4, 480, 428/195, 206, 207; 528/280, 272, 291, 288, 300, 306, 170, 229, 310, 322; 106/31.13, 31.27, 31.29, 31.43, 31.57, 31.58, 31.61

(56) References Cited

U.S. PATENT DOCUMENTS

| | | | | |
|---|---|---|---|---|
| 3,324,033 A | * | 6/1967 | Knapp | 252/51.5 |
| 4,048,252 A | * | 9/1977 | Behmel | 204/500 |
| 4,066,585 A | * | 1/1978 | Schepp et al. | 260/18 N |
| 4,124,571 A | * | 11/1978 | Georgoudis | 525/440 |
| 4,730,556 A | * | 3/1988 | Cobbs, Jr. | 101/129 |
| 4,868,267 A | * | 9/1989 | Bershas et al. | 528/291 |
| 4,873,311 A | * | 10/1989 | Bornack, Jr. et al. | 528/272 |
| 4,874,837 A | * | 10/1989 | Bershas et al. | 524/494 |
| 4,889,560 A | | 12/1989 | Jaeger et al. | 106/27 |
| 4,889,761 A | | 12/1989 | Titterington et al. | 428/195 |
| 4,983,715 A | * | 1/1991 | Miwa et al. | 528/272 |
| 5,179,191 A | * | 1/1993 | Jung et al. | 525/420 |
| 5,231,135 A | | 7/1993 | Machell et al. | 525/123 |
| 5,268,412 A | * | 12/1993 | Raynolds | 524/513 |
| 5,336,753 A | * | 8/1994 | Jung et al. | 525/420 |
| 5,372,852 A | | 12/1994 | Titterington et al. | 427/288 |
| 5,496,879 A | | 3/1996 | Griebel et al. | 524/320 |
| 5,574,078 A | * | 11/1996 | Elwakil | 523/161 |
| 5,621,022 A | | 4/1997 | Jaeger et al. | 523/161 |
| 5,688,312 A | | 11/1997 | Sacripante et al. | 106/31.49 |
| 5,693,128 A | | 12/1997 | Sacripante et al. | 106/31.27 |
| 5,698,017 A | | 12/1997 | Sacripante et al. | 106/31.49 |
| 5,700,316 A | | 12/1997 | Pontes et al. | 106/31.58 |
| 5,750,604 A | | 5/1998 | Banning et al. | 524/187 |
| 5,780,528 A | | 7/1998 | Titterington et al. | 523/161 |
| 5,782,966 A | | 7/1998 | Bui et al. | 106/34.43 |
| 5,783,658 A | | 7/1998 | Banning et al. | 528/590 |
| 5,827,918 A | | 10/1998 | Titterington et al. | 524/590 |
| 5,830,942 A | | 11/1998 | King et al. | 524/590 |
| 6,110,264 A | * | 8/2000 | Banning et al. | 106/31.13 |
| 6,322,624 B1 | * | 11/2001 | Titterington et al. | 106/311 |

FOREIGN PATENT DOCUMENTS

| | | |
|---|---|---|
| DE | 4205636 | 8/1993 |
| DE | 4205713 | 8/1993 |

* cited by examiner

*Primary Examiner*—Vivian Chen
(74) *Attorney, Agent, or Firm*—Oliff & Berridge, PLC

(57) ABSTRACT

A phase change ink carrier composition comprising at least one anhydride/amino alcohol based adduct which is a reaction product of at least one anhydride and at least one amino alcohol, wherein the reaction product is an ester material or an amide material, but not an ester-amide material.

11 Claims, No Drawings

PHASE CHANGE INK CARRIER COMPOSITIONS CONTAINING ANHYDRIDE/AMINO ALCOHOL-BASED ADDUCTS

CROSS-REFERENCE TO RELATED CASES

This application is a continuation-in-part application of U.S. patent application Ser. No. 09/105,308, filed Jun. 25, 1998, U.S. Pat. No. 6,110,264, which is incorporated herein in its entirety.

BACKGROUND OF THE INVENTION

1. Field of the Invention

The present invention relates to selected phase change ink carrier compositions and phase change ink compositions containing those carrier compositions. In particular, the present claimed invention relates to phase change ink compositions containing a phase change ink carrier composition and at least one compatible colorant, wherein the phase change ink carrier composition contains selected anhydride/amino alcohol-based adducts.

2. Brief Description of Art

Phase change inks in digital printing applications (also sometimes called solid inks or hot melt inks) have in the past decade gained significant consumer acceptance as an alternative to more traditional printing systems such as offset printing, flexographic printing, gravure printing, or letter press printing. Phase change inks are especially desirable for the peripheral printing devices associated with computer technology, as well as being suitable for use in other printing technologies such as gravure printing applications as referenced in U.S. Pat. No. 5,496,879 and German Patent Publications DE 4205636AL and DE 4205713AL assigned to Siegwerk Farbenfabrik Keller, Dr. Rung & Co.

In general, phase change inks are in the solid phase at ambient temperature, but exist in the liquid phase at the elevated operating temperature of an ink jet printing device. At the jet operating temperature, droplets of liquid ink are ejected from the printing device and, when the ink droplets contact the surface of the printing media or an intermediate transfer surface, they quickly solidify to form a predetermined pattern of solidified ink drops.

They are easy to use and safe. They can be easily loaded into the printer by the user, generally in the form of solid sticks of yellow, magenta, cyan and black ink having a consistency similar to children's crayons. Inside the printer, these inks are melted at an elevated temperature in a print head having a number of orifices, through which the melted ink will be ejected onto the desired media substrate such as paper or an overhead transparency film. Alternatively, the melted ink may be transferred to a rotating drum and then transferred to the substrate. As the ink cools on the substrate, it re-solidifies to form the predetermined image. This resolidification process, or phase change, is instantaneous and a printed, dry image is thus made upon leaving the printer, and is available immediately to the user.

These phase change inks contain no solvents or diluents that can lead to undesired emissions. In all, the use and specific design of the phase change ink addresses many of the limitations of more traditional ink and printing processes.

Furthermore, because the ink is in a cool, solid form at any time when the user can actually come in contact with the ink, and the ink is in a molten state only inside the printer (inaccessible to the user), it is generally safe to use. These inks also have long-term stability for shipping and storage.

The phase change inks generally comprise a phase change ink carrier composition, which is combined with at least one compatible phase change ink colorant. The carrier composition has been generally composed of resins, fatty acid amides and resin derived materials. Also, plasticizers, waxes, antioxidants and the like have been added to the carrier composition. Generally the resins used must be water-insoluble and the carrier composition may contain no ingredients that are volatile at the jetting temperatures employed. Also, these carrier ingredients should be chemically stable so as not to lose their chemical identity over time and/or under elevated temperature conditions.

Preferably, a colored phase change ink will be formed by combining the above described ink carrier composition with compatible colorant materials, preferably subtractive primary colorants. The subtractive primary colored phase change inks comprise four dye components, namely, cyan, magenta, yellow and black. U.S. Pat. Nos. 4,889,560 and 5,372,852 teach the preferred subtractive primary colorants employed and typically comprise dyes from the classes of Color Index (C.I.) Solvent Dyes, C.I. Disperse Dyes, modified C.I. Acid and Direct Dyes, as well as a limited number of C.I. Basic Dyes. Also suitable as colorants are appropriate polymeric dyes, such as those described in U.S. Pat. No. 5,621,022 available from Milliken & Company as Milliken Ink Yellow 869, Milliken Ink Blue 92, Milliken Ink Red 357, Milliken Ink Yellow 1800, Milliken Ink Black 8915–67, uncut Reactint Orange X-38, uncut Reactint Blue X-17, and uncut Reactint Violet X-80, or those described in U.S. Pat. No. 5,231,135. Colored resin reaction products, as described in U.S. Pat. No. 5,780,528 which is assigned to the assignee of the present invention, are also suitable colorants.

The specific choice of ingredients, as well as their relative amounts, is of critical importance in achieving the desired application performance properties of the phase change inks. Specific physical and chemical properties sought in these inks include viscosity, surface tension, flexibility, durability, and thermal stability, as well as the ability to deliver color.

In particular, two desired properties of phase change inks are (1) durability of printed images and (2) jettability of the ink to produce images on a substrate.

The following U.S. Patents teach specific phase change ink compositions.

U.S. Pat. No. 4,889,560 teaches a phase change ink carrier composition that comprises a fatty amide-containing material which is a mixture of a tetra-amide compound and a mono-amide compound and wherein the phase change ink composition containing this carrier composition has a high degree of lightness and chroma and thin films of uniform thickness of such inks are rectilinearly light transmissive.

U.S. Pat. No. 4,889,761 teaches a method for producing a light-transmissive phase change ink printed substrate wherein a predetermined pattern of a light-transmissive phase change ink which initially transmits light in a non-rectilinear path is printed on at least one surface of a substrate; the pattern of solidified phase change ink is then reoriented to form an ink layer of substantially uniform thickness which, in turn, produces an image that will transmit light in a substantially rectilinear path.

U.S. Pat. No. 5,372,852 teaches that the selective phase change ink composition that contains a phase change carrier composition comprises a fatty amide-containing material (either a tetra-amide compound or mono-amide or mixtures thereof). This patent further teaches the preferred tetra-amide compounds are made by reacting a fatty acid, a diamine (ethylene diamine) and a dimer acid. The preferred fatty acid is stearic acid and the preferred dimer acid is a hydrogenated oleic acid dimer product known as EMPOL 1008 Dimer Acid, manufactured by the Emery Division of Henkel Corporation of Cincinnati, Ohio. The preferred mono-amides are taught to be secondary mono-amides such as behenyl behenamide and stearyl stearamide, products made under the KEMAMIDE trademark by Witco Chemical Company.

U.S. Pat. Nos. 5,750,604; 5,780,528; 5,782,966; 5,783,658; 5,827,918; and 5,830,942, all assigned to the assignee of the present patent application, disclose a number of urethane, urea and mixed urethane/urea resins appropriate for use in phase change ink compositions.

While the phase change ink compositions described by the above-noted U.S. Patents have met with great commercial success, there is always a need to improve those inks for more demanding processing conditions and different applications. Besides their performance on the printed substrates, inks and individual ink components that go into the inks also must be measured by their cost and ease of manufacturing as well as how they work in a particular printer. The ideal phase change ink for a plain paper printer is one that encompasses the best qualities from all printing technologies, such as bright, vivid color with the ability to print on plain paper or overhead transparencies and produce durable images.

Additionally, U.S. Pat. No. 5,688,312 describes a hot melt ink composition with an imide or bisimide and U.S. Pat. No. 5,693,128 describes another hot melt ink composition that is the reaction product of a mono-anhydride and a di-, tri- or tetramine or mixtures thereof.

Finally, U.S. Pat. Nos. 5,176,745 and 5,310,887 teach the reaction of colorants with alkenyl succinic anhydride for use in aqueous inks.

There still remains the need for alternative hot melt or solid ink formulations that permit the tailoring of components to produce the desired range of physical and chemical properties in the resulting inks and carrier compositions for use in specific printing applications. This need is addressed in the present invention by forming reaction products with the desired range of physical and chemical properties from the reaction of amino alcohols with anhydrides.

BRIEF SUMMARY OF THE INVENTION

The present invention is based on the discovery of a class of components useful in phase change carrier compositions and phase change inks that can be easily tailored to provide a wide range of physical and chemical properties in such carrier and ink compositions and thus make such carrier and ink compositions particularly suitable for specific printing applications. Additionally, the components of the present invention could be used by themselves as the sole components of phase change ink carrier compositions or could be employed in conjunction with conventional phase change ink carrier components (e.g., amides, waxes, resinous components, tackifiers, toughening agents, hardeners, adhesion promoters and the like).

Accordingly, one aspect of the present invention is directed to a phase change ink carrier composition comprising at least one anhydride/amino alcohol-based adduct.

Another aspect of the present invention is directed to phase change inks that contain a phase change ink carrier composition and at least one compatible colorant wherein said ink carrier composition comprises at least one anhydride/alcohol-based adduct.

Preferably, the anhydride/amino alcohol-based adduct components used in the carrier compositions and ink compositions of the present invention are the reaction products of anhydrides with amino alcohols or amino alcohols mixed with other nucleophiles.

It is a feature of the present invention that the reaction products may contain combinations of ester, amide or imide functionalities.

It is another feature of the present invention that the reaction products are formed from the reaction of at least one anhydride and at least one amino alcohol.

It is yet another feature of the present invention that one or more of the traditional phase change ink carrier composition components can be replaced by anhydride/amino alcohol-based reaction products.

It is still another feature of the present invention that the reaction products can include carboxylic acid/ester, carboxylic acid/ester/amide, di- or multi-ester, mixed ester/amide, mixed ester/amide/imide and mixed carboxylic acid/amide/imide/ester products.

It is an advantage of the present invention that these anhydride/amino alcohol inclusive reaction products can be tailored to achieve desired properties in a resultant phase change ink and are compatible with other conventional phase change ink carrier components and conventional phase change ink colorant materials.

These and other aspects, features, and advantages are provided in the present invention by the material resulting from the reaction between at least one anhydride and at least one amino alcohol, as well as the phase change ink carrier composition that includes such material.

DETAILED DESCRIPTION OF THE PREFERRED EMBODIMENTS OF THE PRESENT INVENTION

The term "nucleophile" in the present specification and claims is used as defined on page 179 of "Advanced Organic Chemistry", 3rd Edition by Jerry March, © 1985 by John Wiley and Sons, to describe a reagent that brings an electron pair to a reaction to form a new bond. The preferred nucleophiles of this invention possess the amino functionality of the amino alcohols, but it is understood that other nucleophilic functional groups that are capable of reacting with the anhydride moiety could also be used with these amino alcohols.

The expression anhydride/amino alcohol inclusive reaction products as used in the present specification and claims refers to any reaction product of at least one anhydride and at least one amino alcohol. This expression also includes reaction products of at least one anhydride with mixtures of amino alcohols or by sequential reactions with amino alcohol.

This expression further includes subsequent reaction products of such anhydride/amino alcohol inclusive reaction products with other materials, such as nucleophiles or nucleophiles containing colorants. These other nucleophiles typically can include alcohols, amino alcohols, or colorants containing alcohol or amine functionalities.

The expression anhydride-based ester adducts as used in the present specification and claims refers to any reaction product of at least one anhydride with at least one alcohol functional group of the amino alcohol wherein the reaction product contains at least one ester moiety.

The expression anhydride-based diester adducts refers to any reaction products of at least one anhydride with sufficient alcohol functionality provided by the amino alcohol wherein the reaction product contains at least two ester moieties.

The expressions "anhydride-based amide adducts" and "anhydride-based imide adducts" refer to any reaction products of at least one anhydride with the amine functional groups in the amino alcohol reactant wherein the reaction product contains one or more amide or imide moieties.

Preferred anhydrides to react with amino alcohol to make the anhydride/amino alcohols inclusive reaction products Of the present invention include monoanhydrides and di-anhydrides and synthetic equivalents thereof, such as a diacid, a diacid halide, or a diester. Suitable aromatic anhydrides include phenylmaleic anhydride; 2,3-diphenylmaleic anhydride; 2-phenylglutaric anhydride; homophthalic anhydride; isatoic anhydride; n-methylisatoic anhydride; 5-chloroisatoic anhydride; phthalic anhydride; 3,3', 4,4'-benzophenonetetracarboxylic dianhydride; 4-methylphthalic anhydride; 4,4'-(hexafluoroisopropylidene)-diphthalic anhydride; 3,6-difluorophthalic anhydride; 3,6-dichlorophthalic anhydride; 4,5-dichlorophthalic anhydride; tetrafluorophthalic anhydride; tetrachlorophthalic anhydride; tetrabromophthalic anhydride; 3-hydroxyphthalic anhydride; 1,2,4-benzenetricarboxylic anhydride; 3-nitrophthalic anhydride; 4-nitrophthalic anhydride; 1,2,4,5-benzenetetracarboxylic dianhydride; diphenic anhydride; 1,8-naphthalic anhydride; 4-chloro-1,8-naphthalic anhydride; 4-bromo-1,8-naphthalic anhydride; 4-amino-1,8-naphthalic anhydride; 3-nitro-1,8-naphthalic anhydride; 4-nitro-1,8-naphthalic anhydride; 4-amino-3,6'disulfo-1,6-disulfo-1,8-napthalic anhydride, dipotassium salt; 1,4,5,8-naphthalenetetracarboxylic dianhydride; and 3,4,9,10-perylenetetracarboxylic dianhdyride. Suitable non-aromatic anhydrides include cis-1,2,3,6-tetrahydrophthalic anhydride; cis-5-norbornene-endo-2,3dicarboxylic anhydride; endo-bicylco[2,2,2]oct-5-ene-2,3dicarboxylic anhydride; cantharidin; methyl-5-norbomene-2,3-dicarboxylic anhydride; exo-3, 6,epoxy-1,2,3,6-tetrahydrophthalic anhydride; S-acetylmercaptosuccinic anhydride, (+)-diacetyl-L-tartaric anhydride; bicyclo[2,2,2]octo-7-ene-2,3,5,6-tetracarboxylic dianhydride; maleic anhydride; citraconic anhydride; 2,3-dimethylmaleic anhydride; 1-cyclopentene-1,2-dicarboxylic anhydride; 3,4,5,6-tetrahydrophthalic anhydride; bromomaleic anhydride; dichloromaleic anhydride; 1,4,6,7,7-hexachloro-5-norbomene-2,3-dicarboxylic anhydride; cis-aconitic anhydride; glutaric anhydride; 3-methylglutaric anhydride; 2,2-dimethylglutaric anhydride; 3,3-dimethylglutaric anhydride; 3-ethyl-3-methylglutaric anhydride; 3,3-tetramethyleneglutaric anhydride; hexafluoroglutaric anhydride; 3,5,-diacetyltetrahydropyran-2,4,6-trione; ethylenediaminetetraacetic dianhydride; diethylenetriaminepentaacetic dianhydride; diglycolic anhydride;succinic anhydride; methylsuccinic anhydride; 2,2-dimethylsuccinic anhydride; isobutenylsuccinic anhydride; (+/−)-2-octen-1-ylsuccinic anhydride; octadecenylsuccinic anhydride; 3-oxabicyclo[3,1,0]hexane-2,4-dione; cis-1,2-cyclohexanedicarboxylic anhydride; trans-1,2-cyclohexanedicarboxylic anhydride; hexahydro-4-methylphthalic anhydride; itaconic anhydride; and 2-dodecen-1-ylsuccinic anhydride.

Suitable polymers containing anhydride functionalities and synthetic equivalents to anhydride functionalities that can be reacted with amino alcohol and be used in the present invention include poly(methyl vinyl ether-maleic acid); poly(acrylic acid-co-maleic acid); poly(vinyl chloride-co-vinylacetateco-maleic acid); poly(ethylene-maleic anhydride); poly(maleic anhydride-1-octadecene); poly(styrene-co-maleic anhydride); poly(methyl vinyl ether-maleic anhydride); poly(ethylene-co-ethyl acrylate-co-maleic anhydride); poly(ethylene-co-vinyl acetate)-graft-maleic anhydride; polyethylene-graft-maleic anhydride; and polypropylene-graft-maleic anhydride.

These anhydride/amino alcohol-based adducts are most preferably made from cyclic anhydrides. Suitable cylic anhydrides include trimellitic anhydride and maleic anhydride. Alkenylsuccinic anhydrides (ASAs) are the preferred class of monoanhydrides. Benzophenone tetracarboxylic dianhydride is the preferred dianhydride. Other possible cyclic anhydrides include alkylsuccinic anhydride, succinic anhydride, and phthalic anhydride.

The amino alcohol precursors include any compound that contains at least alcohol functional group and at least one amine functional group. The preferred classes of amino alcohols are monoalkanol amines and dialkanol amines and can include trialkanol amines and combinations thereof However, the selection of a particular amino alcohol will yield differentiated products wherein the reaction can produce esters, amides, imides, bisamides, bisimides, organic salts and cross-linked materials. This range of product functionality can be used to tailor different physical properties as needed by selection of stoichiometry and reaction conditions. Examples of amino alcohols include ethanolamine; 3-amino-1,2-propanediol; serinol; 2-amino-2-methyl-1,3-propanediol; tris(hydroxymethyl)-aminomethane; 1-amino-1-deoxy-D-sorbitol; diethanol amine; diisopropanolamine; N-methyl-N,N-diethanol anmine; triethanol amine; and N,N,N',N'-tetrakis (2-hydroxypropyl) ethylenediamine and combinations thereof.

The anhydride/amino alcohol inclusive reaction products may be made by any conventional reaction conditions that will produce the desired proportions of the different reaction products available from the starting amino alcohols. After this reaction, the desired anhydride/amino alcohol inclusive reaction product may be recovered from the reaction mixture by any conventional reaction product recovery procedure. The preferred reaction method is to run the reaction solventless at an elevated temperature with reduced pressure to remove volatile reaction products such as water to obtain the final product in a pure, molten form.

Preferably, this invention comprises selective phase change ink compositions for use in a process by which such compositions are indirectly applied via an intermediate transfer surface to a final receiving surface or substrate. These preferred phase change ink compositions of the instant invention comprise a specific phase change ink colorant and a specific phase change ink carrier composition that contain at least one anhydride amino alcohol inclusive reaction product. The specific phase change ink carrier composition is formulated so that it produces a selective ink composition having predetermined fluidics and mechanical properties which meet the parameters required for the indirect application via an intermediate transfer surface of the ink composition to a final receiving substrate as disclosed in U.S. Pat. No. 5,389,958 issued Feb. 14, 1995.

The colorant employed either as a reactant or in the phase change ink compositions of the present invention may be any subtractive primary colorant compatible with the particular phase change ink carrier composition employed. The subtractive primary colored phase change inks of this invention generally comprise dyes providing primary component colors, namely, cyan, magenta, yellow and black. The dyes employed as subtractive primary colorants may be dyes from the following dye classes: Color Index (C.I.) dyes; solvent dyes; disperse dyes; modified acid and direct dyes; basic dyes. Besides these classes of dyes, the ink compositions of the present invention preferably also include selected polymeric dyes as one or more colorants.

Polymeric dye colorants are available from Milliken & Company. Examples include Milliken Ink Blue 92, Milliken Ink Red 357, Milliken Ink Yellow 1800, and Milliken Ink Black 8915–67, certain of which contain a class of chromophores containing polyoxyalkylene substitution and reactive hydroxyl functionality. Other yellow, cyan, magenta and black polymeric dyes are within the scope of this invention and may be utilized. These polymeric dyes may be used alone or in combination with conventional colorants disclosed in U.S. Pat. No. 5,372,852 to make individual phase change inks of each primary color. In addition, phase change inks that contain polymeric dyes may be used in an ink jet printer with phase change inks that contain conventional powdered dyes.

Various modifying agents may preferably be added to a phase change ink carrier composition along with the anhydride amino alcohol inclusive reaction product.

These include fatty acid amide-containing materials such as tetra-amide compounds, hydroxyl-functional tetra-amide compounds, mono-amides and hydroxyl-functional mono-amides, and mixtures thereof. The preferred tetra-amides and mono-amides are described in U.S. Pat. No. 4,889,560, which is incorporated herein by reference.

Other preferred modifying agents include certain tackifiers. The preferred tackifiers encompass those that are compatible with fatty amide-containing materials. These include, for example, KE-311 or KE-100 resins (glycerol esters of hydrogenatediabietic [rosin] acid made by Arakawa Chemical Industries, Ltd.), Foral 85 (a glycerol ester of hydrogenated abietic [rosin] acid, Foral 105 (a pentaerythritol ester of hydroabietic [rosin] acid), Cellolyn 21 (a hydroabietic [rosin] alcohol ester of phthalic acid), all manufactured and sold under the listed tradenames by Hercules Chemical Company, Nevtac 2300 and Nevtac 80 (synthetic polyterpene resins) manufactured and sold under the listed tradenames by Neville Chemical Company, and Wingtack 86 (a modified synthetic polyterpene resin) manufactured and sold under the listed tradename by Goodyear Chemical Company. The most preferred tackifier, however, is KE-311.

Certain plasticizers are another of the preferred modifying agents that can be added to the formulation. For instance, many of the phthalate ester plasticizers sold by Monsanto under the tradename "SANTICIZER" are suitable for this purpose. However, the preferred plasticizer is SANTICIZER 278, which is the mixed di-ester of phthalic acid with benzyl alcohol and 2,2,4-trimethyl-1,3-pentanediol mono(2-methylpropanoate) sold under the tradename "TEXANOL".

Other additives may be combined with the phase change ink carrier composition. In a typical phase change ink chemical composition antioxidants are added for preventing discoloration of the carrier composition. The preferred antioxidant materials can include IRGANOX 1010 manufactured and sold under the listed tradename by Ciba Geigy; and NAUGARD 76, NAUGARD 445, NAUGARD 512, and NAUGARD 524 manufactured and sold under the listed tradenames by Uniroyal Chemical Company. However, the most preferred antioxidant is NAUGARD 445.

Viscosity reducing agents may also be employed in the ink compositions of the present invention. Use of a viscosity reducing agent allows the viscosity of the ink composition to be adjusted to a desired value. Suitable viscosity reducing agents for use in ink compositions of the present invention include stearyl stearylamide, stearyl monoethanolamide stearate, and ethylene glycol distearate (EGDS). One preferred viscosity reducing agent is KEMAMIDE S-180 stearyl stearylamide made by Witco Chemical Co. The viscosity reducing agent may be present in an amount of from about 0 to about 50% by weight of the ink composition. The specific amount of viscosity reducing agent used in a given ink composition depends on the viscosity desired by the user.

While the modifying agents mentioned above may be used for the certain preferred embodiments of this invention, other materials with similar properties can be combined with or used to produce different phase change ink compositions with mechanical and fluidics properties similar to those outlined above. These other materials can include paraffins, microcrystalline waxes, polyethylene waxes, ester waxes, oligomers or low molecular weight polymers and copolymers such as ethylene/vinyl acetate (EVA), ethylene/acrylic acid copolymers, EVA/acrylic acid copolymers, ionomers, copolymers of acrylic acid with polyamides, and the like.

The phase change ink carrier composition may contain an anhydride/amino alcohol-based adduct, a tetra-amide and a mono-amide compound and at least one further modifying agent, such as a tackifier, a plasticizer, and an antioxidant. The phase change ink carrier composition can also include isocyanate-derived resins, such as urethane and/or mixed urethane/urea resins in combination with or in place of the aforementioned components. Preferred compositional ranges of a phase change ink carrier composition are as follows: from 10 to about 50 weight percent of an anhydride-based adduct, from about 1 to about 80 weight percent each of a tetra-amide compound and a mono-amide compound, from about 0 to about 40 weight percent of a tackifier, from about 0 to about 30 weight percent of a plasticizer and about 0 to about 2 percent of an antioxidant.

Thin films of uniform thickness of the phase change ink composition on the final receiving substrate when cooled to the ambient temperature must be ductile and retain sufficient flexibility so the image will not fracture upon bending, while possessing a high degree of lightness, chroma, transparency and thermal stability.

It has been determined that a phase change ink composition must have certain fluidic and mechanical properties in order to produce a printed substrate of high quality in an offset printing process employing an intermediate transfer surface. These desirable properties of the phase change ink compositions of this invention in the solid state are specified and measured by using several analytical techniques. One such technique is dynamic mechanical analyses (DMA). DMA is a technique capable of measuring the viscoelastic properties of a material and identifying the material's elastic and viscous components.

The phase change ink compositions as finally applied to the substrate make a finished print exhibiting excellent color properties. Thin films of uniform thickness of the phase change ink composition are rectilinearly light transmissive and exhibit exemplary $C^*ab$ and $L^*$ values.

Another important property of phase change inks is viscosity. The viscosity of the molten ink must be matched to the requirements of the ink jet device and optimized versus other physical properties of the ink. It is preferred that the viscosity of the phase change ink carrier composition at 140° C., and in turn the ink composition of this invention, is from about is 5 to about 30 centipoise, more preferably from about 10 to about 20 centipoise, and most preferably from about 11 to about 15 centipoise.

As previously indicated, the subject phase change ink formed from the phase change ink carrier composition exhibits excellent physical properties. For example, the subject phase change ink exhibits a high level of lightness, chroma, and rectilinear light transmissivity when utilized in a thin film of substantially uniform thickness, so that color images can be conveyed using overhead projection techniques. Furthermore, the preferred phase change ink compositions exhibit the preferred mechanical and fluidics properties mentioned above when measured by DMA, compressive yield testing and viscometry, and more importantly, work well when used in the indirect printing process described in U.S. Pat. No. 5,389,958 issued Feb. 14, 1995, and assigned to the assignee of the present invention. This patent is incorporated herein by reference in its entirety.

The ink utilized in the process and system of the instant invention is preferably initially in solid form and is then changed to a molten state by the application of heat energy to raise the temperature from about 85° C. to about 150° C. The molten ink is then applied in raster fashion from the ink jets in the printhead to the exposed surface of the liquid layer forming the intermediate transfer surface, where it is cooled to an intermediate temperature and solidifies to a malleable state in which it is transferred to the final receiving surface via a contact transfer by entering the nip between the pressure and fusing roller and the liquid layer forring the intermediate transfer surface on the support surface or drum. This intermediate temperature where the solidified ink is maintained in its malleable state is between about 30° C. to about 80° C.

Once the solid malleable ink image enters the nip, it is deformed to its final image conformation and adheres or is fixed to the final receiving substrate either by the pressure exerted against the ink image on the final receiving substrate by the pressure and fusing roller alone, or by the combination of the pressure and heat supplied by appropriate heating apparatus. Additional heating apparatus could optionally be employed to supply heat to facilitate the process at this point. The pressure must be sufficient to have the ink image adhere to the final receiving substrate and be sufficiently deformed to ensure that light is transmitted through the ink image rectilinearly or without significant deviation in its path from the inlet to the outlet, in those instances when the final receiving substrate is a transparency. Once adhered to the final receiving substrate, the ink image is cooled to ambient temperature of about 20° C. to about 25° C. The ink comprising the ink image must be ductile, or be able to yield or experience plastic deformation without fracture when kept above the glass transition temperature. Below the glass transition temperature the ink is brittle. The temperature of the ink image in the ductile state is between about –10° C. and to about the melting point, or less than about 85° C.

The following Examples are illustrative of the phase change ink formulations that may be employed both with and without a liquid intermediate transfer surface, without any intent to limit the invention to the specific materials, process or structure employed. All parts and percentages are by weight unless explicitly stated otherwise.

EXAMPLE 1

The Reaction Product of Octadecenylsuccinic Anhydride and 2 Moles of Diethanol Amine To a 1000 ml four-neck resin kettle equipped with a Trubore stirrer, $N_2$ inlet, vacuum distillation attachment, and thermocouple-temperature controller was added about 100.0 grams (0.286 moles) of octadecenyl succinic anhydride and heated to 68° C. with stirring under nitrogen. About 61.2 grams (0.583 moles) of diethanol amine[2] was then added over 3 minutes. An exotherm to about 88° C. was observed and the reaction mixture increased in viscosity to the point that agitation was stopped. The thermocouple-temperature controller was set at 170° C. When the temperature reached 140° C., stirring was resumed and water began condensing on the inside top of the kettle. The vacuum distillation apparatus was then attached and a vacuum applied. The temperature was increased to 175° C. and held for 2 hours with vacuum until bubbling ceased. The final adduct was then poured into aluminum molds and allowed to cool and harden. This final product was a transparent, homogeneous, rubbery sold and characterized by the following physical properties: viscosity of about 591.2 cPs as measured by a Ferranti-Shirley cone-plate viscometer at about 140° C., a melting point of about 50.0 to about 55.0° C. as measured by an Electrothermal capillary melting point apparatus.

[1] Octadecenyl Succinic Anhydride (ODSA) available from Milliken Chemicals, Spartanburg, S.C.
[2] Diethanolamine available from Aldrich Chemicals of Milwaukee, Wis.

EXAMPLE 2

Cyan Ink Made From an Anhydride-Derived Resin, a Urethane/Urea Resin and an Amide Wax In a stainless steel beaker were combined 100 grams of the urethane-urea resin from Example 2 of U.S. Pat. No. 5,783,658, 100 grams of the material from Example 1 of the present application, 340 grams of Witco S-180 stearyl stearamide wax[1], and 1 gram of Naugard 445 antioxidant[2]. The materials were melted overnight at 125° C. To the molten ink base was added 11.0 grams of Solvent Blue 44 dye[3], then the ingredients were blended by stirring in a temperature controlled mantle for 2 hours at 125° C. The ink was then filtered through a heated (125° C.) Mott apparatus (available from Mott Mettalurgical) using Whatman #3 filter paper at 15 psi. The ink was poured into molds and allowed to solidify to form ink sticks. This final cyan ink product was characterized by the following physical properties: viscosity of about 12.89 cPs at 140° C. as measured by a Ferranti-Shirley cone-plate viscometer, a melting point of about 91° C. as measured by differential scanning calorimetry using a DuPont 2100 calorimeter and a Tg of about 10° C. as measured by Dynamic Mechanical Analysis using a Rheometrics Solids Analyzer (RSAII). The spectral strength of the ink was determined using a spectophotographic procedure based on the measurement of the colorant in solution by dissolving the ink in butanol and measuring the absorbance using a Perkin Elmer Lambda 2SUV/VIS spectrophotometer. The spectral strength of the ink was measured as about 2538 milliliters*Absorbance Units per gram at the lambda max of 670 nm. This ink was placed in a Phaser 340 printer that uses an offset transfer printing process. The ink was printed using a print head temperature of 140° C., a drum temperature of 62° C. and a paper preheat temperature of 60° C. The samples showed excellent durability including very good resistance to flaking or cracking of the ink when the sample was folded.

[1] Kemamide S-180—Stearyl Stearamide available from Witco Chemical Company of Memphis, Tenn.
[2] Naugard 445—Antioxident available from Uniroyal Chemical Company of Oxford, Conn.
[3] Solvent Blue 44—Dye available from Clairant Corporation of Charlotte, N. C.

While the invention has been described above with reference to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

What is claimed is:

1. A phase change ink carrier composition comprising at least one anhydride/amino alcohol inclusive reaction product, wherein said at least one anhydride/amino alcohol inclusive reaction product is an ester or an amide, but not an ester-amide.

2. The phase change ink carrier composition of claim 1 wherein the anhydride/amino alcohol inclusive reaction product is selected from anhydride based mono ester adducts, anhydride based diester adducts, anhydride-based mono-amide adducts, anhydride-based diamide adducts, and anhydride-based imide adducts and combinations thereof.

3. The phase change ink carrier composition of claim 1 wherein the anhydride/amino alcohol inclusive reaction product is made from a cyclic anhydride.

4. The phase change ink carrier composition of claim 3 wherein the cyclic anhydride is an alkylsuccinic anhydride or an alkenylsuccinic anhydride.

5. The phase change ink carrier composition of claim 1 wherein the at least one amino alcohol is selected from the group consisting of monoalkanol amines, dialkanol amines and trialkanol amines and combinations thereof.

6. The phase change ink carrier composition of claim 1 wherein the amino alcohol is selected from the group consisting of: ethanolamine; 3-amino-1,2-propanediol; serinol; 2-amino-2-methyl-1,3-propanediol; tris(hydroxymethyl)-aminomethane; 1-amino-1-deoxy-D-sorbitol; diethanol amine; diisopropanolamine; N-methyl-N,N-diethanol amine; triethanol amine; N,N,N',N'-tetrakis (2-hydroxypropyl) ethylenediamine; and combinations thereof.

7. The phase change ink carrier composition of claim 1 further including a wax selected from the group consisting of an ester, an amide, a natural wax, a synthetic wax and mixtures thereof.

8. The phase change ink carrier composition of claim 1 further including an antioxidant.

9. A phase change ink composition comprising the phase change ink carrier composition of claim 1 and at least one compatible colorant.

10. The phase change ink composition of claim 1 wherein the phase change ink carrier composition further has a component selected from the group consisting of urethanes, ureas, mixed urethane/urea resins, and mono-amides and combinations thereof.

11. A phase change ink carrier composition comprising at least one anhydride/amino alcohol inclusive reaction product, wherein functional groups of said at least one anhydride/amino alcohol inclusive reaction product consist of only ester groups or only amide groups.

* * * * *